US005748189A

United States Patent [19]

Trueblood

[11] Patent Number: 5,748,189
[45] Date of Patent: May 5, 1998

[54] METHOD AND APPARATUS FOR SHARING INPUT DEVICES AMONGST PLURAL INDEPENDENT GRAPHIC DISPLAY DEVICES

[76] Inventor: John Trueblood, 9439 Fairgrove La., #206, San Diego, Calif. 92129

[21] Appl. No.: 531,209

[22] Filed: Sep. 19, 1995

[51] Int. Cl.$^6$ ...................................................... G06F 3/00
[52] U.S. Cl. ............................ 345/331; 345/145; 345/340
[58] Field of Search .................................. 395/326–358; 345/145–146, 119–120, 2, 157, 160, 163, 326–358

[56] References Cited

U.S. PATENT DOCUMENTS

| | | | |
|---|---|---|---|
| 4,112,423 | 9/1978 | Bertolasi | 340/324 AD |
| 4,698,625 | 10/1987 | McCaskill et al. | 345/145 |
| 4,974,173 | 11/1990 | Stefik et al. | 395/332 |
| 4,987,411 | 1/1991 | Ishigami | 345/145 |
| 5,047,754 | 9/1991 | Akatsuka et al. | 340/709 |
| 5,107,443 | 4/1992 | Smith et al. | 395/332 |
| 5,198,802 | 3/1993 | Bertram et al. | 345/157 X |
| 5,280,583 | 1/1994 | Nakayama et al. | 395/330 |
| 5,298,890 | 3/1994 | Kanamaru et al. | 345/119 X |
| 5,585,821 | 12/1996 | Ishikura et al. | 345/145 |
| 5,596,347 | 1/1997 | Robertson et al. | 345/145 |

FOREIGN PATENT DOCUMENTS

| | | | |
|---|---|---|---|
| 6-274305 | 9/1994 | Japan | G06F 3/14 |
| 2282944 | 4/1995 | United Kingdom | G06F 3/023 |

OTHER PUBLICATIONS

Ishii et al., "Toward an Open Shared Workspace: Computer and Video Fusion Approach of Teamworkstation", Communications of the ACM, pp. 37–49.

*Primary Examiner*—John E. Breene
*Attorney, Agent, or Firm*—Limbach & Limbach L.L.P.

[57] ABSTRACT

A method and apparatus for using a single keyboard and/or mouse in multi-screen operation with a multiplicity of independent display apparatus. A keyboard and/or mouse is associated with a master work station to which is coupled a display apparatus. One or more other display apparatus are coupled to the same work station or to other work stations which are coupled to the main work station through a local area network or the like. Each display apparatus is driven by separate driver software, such as X-server software. A software construct running in the main work station defines transition boundaries between the various display devices and, as the mouse cursor reaches a transition boundary, it disappears from the first screen and appears on another screen. The keyboard follows the mouse such that its operation affects the screen and work station associated with the display upon which the mouse appears at that time. The software construct intercepts all keyboard and/or mouse data and simulate events, which are transmitted to the work station associated with the selected display terminal.

23 Claims, 14 Drawing Sheets

Microfiche Appendix Included
(1 Microfiche, 15 Pages)

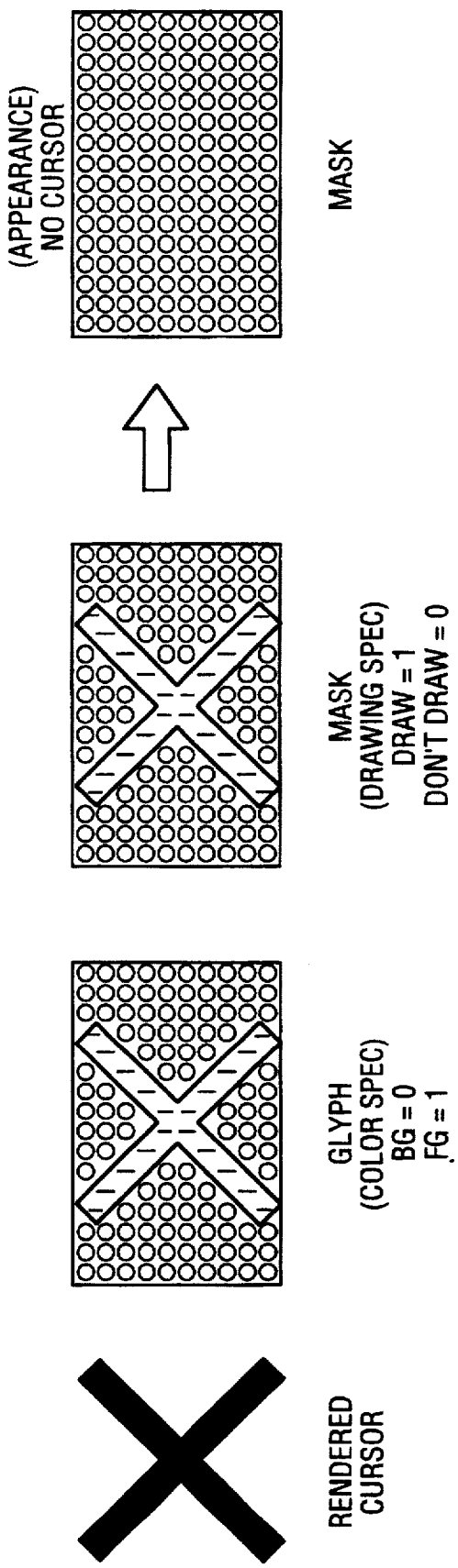

METHOD AND APPARATUS FOR SHARING INPUT DEVICES AMONGST PLURAL INDEPENDENT GRAPHIC DISPLAY DEVICES

MICROFICHE APPENDIX

A microfiche appendix exists for a proof-of concept, mimimal implementation software program of the present invention and includes one microfiche and a total number of fifteen frames. This portion of the disclosure of this patent document contains material which is subject to copyright protection. The copyright owners have no objection to the facsimile reproduction by anyone of the patent document or the patent disclosure, as it appears in the Patent and Trademark Office patent files or records, but otherwise reserve all copyright rights whatsoever.

FIELD OF THE INVENTION

The invention pertains to an independent graphic display system which can share input devices with other independent graphic display systems. More particularly, the invention relates to a software device which allows a mouse to be used simultaneously with a plurality of independent graphic display apparatus.

BACKGROUND OF THE INVENTION

The use of a mouse having a corresponding cursor on a display terminal in order to interact with a computer program is well known. The use of a keyboard to enter text or other data and/or move a cursor on a display terminal also is well known. In certain environments, it is desirable to have multiple display terminals physically positioned adjacent to one another so that they can be used in conjunction with each other. One example of such an environment is in air traffic control. Particularly, a plurality of display terminals may be used to depict a portion of a large air space surrounding an airport. Each terminal depicts a portion of the total air space which it is desired to monitor. The plurality of terminals taken together depict the total air space. Under normal conditions, one air traffic controller may be assigned to a portion of the air space represented by a single display terminal.

The controller would have a keyboard and mouse for use in conjunction with that particular display terminal. For instance, as a blip (an array of illuminated pixels) representing an aircraft appears on his display screen, the air traffic controller may move his mouse in order to position the mouse cursor over that blip and click on it in order to open up a box for entering information. The controller could then use the keyboard to enter information pertaining to that blip, such as information identifying the air line and flight number of the aircraft represented by the blip and other information. Normally, each display terminal is associated with its own separate work station, which includes a keyboard and mouse.

It often is desirable to allow one air traffic controller to control the air space represented by a multiplicity of the display screens. In such a situation, it would be extremely inconvenient if the air traffic controller had to switch keyboards and mice every time he had to manipulate data on a different display screen/work station. Accordingly, systems are known in the prior art for allowing a single work station's keyboard and mouse set to control a plurality of display terminals. In such systems, a display controller card for each display terminal is plugged into a separate slot of a single work station. Specially designed binding software is run on that work station which binds all of the display cards together and allows the single keyboard and mouse associated with that work station to be used in connection with any of the display terminals associated with that work station.

A drawback of this type of system is that the various display terminals must be supportable by the binding software. In the real world, this generally means that the display terminals must be identical to each other or at least manufactured by the same vendor. Also, the binding software frequently will utilize extensions to the basic display language. For instance, air traffic control display software typically utilizes the X-Window language and protocol, which comprises 212 standardized commands. However, multiple screen control software commonly uses extensions to the basic language. Such software can be used only with displays and graphic controller cards which support those particular extensions. This severely limits the display terminal selection.

FIG. 1 is a software block diagram generally illustrating an exemplary computer display system, such as an air traffic control system utilizing the X-Window Language and protocol. In the software block diagram in this application, elements represented by rectangular boxes are hardware and elements represented by oval or circular boxes are software. A host computer 10 has associated with it a keyboard 12, mouse 14 and a display terminal 16. Running on the host computer 10 are several pieces of software, including an operating system 18, for example UNIX, a plurality of application (or client) programs 20a, 20b and 20c and an X-server program 22. The client software may comprise, for instance, an air traffic control system program, a word processing program, a spread sheet program, etc.

The X-server software layer 22 includes a driver 24 for driving the display 16. Basically, the X-server receives data from the input devices (e.g., the keyboard and mouse) through the operating system as well as X-commands from the clients and processes those commands and data to drive the display in accordance therewith. The X-server can also send X-protocol information (termed events) to the client or operating system either directly from the X-server layer or from the display through the X-server layer.

Data flow from the X-server layer to the clients or operating system typically occurs, for example, responsive to the X-server receiving cursor movement data from a mouse. Specifically, application programs typically need to know where the mouse cursor appears on the screen. Thus, when the X-server receives mouse movement data from the mouse, it typically sends events to one or more application programs informing it of the movement and/or position of the cursor.

The keyboard 12 and mouse 14 communicate with the client software 20a, 20b, 20c and the display 16 through the UNIX layer and X-server 22. The client programs and UNIX software layer 18 communicate with the display terminal 16 through the X-server software layer. Particularly, each client may send X-Window commands to the X-server 22. The X-server software 22 takes the commands and drives the display terminal 16 as dictated by the commands received from the client programs. Some X-protocol commands require responses either from the X-server or from the display device (through the X-server). Accordingly, the communication paths between the client programs and the X-server are illustrated as bidirectional.

As will be described in greater detail hereinafter, a single X-server can drive a single display (as shown in FIG. 1) or multiple displays. Further, a client program may communicate with one or more X-servers. Accordingly, a client program can cause changes to the display to occur on multiple displays through either or both of these mechanisms. Also, a client may communicate with X-servers and displays on the same or different host computers. Of course, to communicate with X-servers and displays on different hosts, the computer on which the client program is resident and the computer on which the particular X-server layer is resident must be connected through a communication link, such as a local area network (LAN).

In fact, a plurality of clients on a plurality of different host computers may communicate through a LAN or other communication link with one or more X-servers (each server driving one or more display terminals) on other host computers (or on a free standing X-terminal).

X-Window provides an environment variable which allows the client program to specify the display to which data or commands are being sent. Particularly, X-Window provides an environment variable called DISPLAY. The variable DISPLAY is followed by a hostname (which, for example, is an ethernet address identifying the host computer or X-terminal containing the display with which it intends to communicate). The hostname is followed by a server number and a screen number. Thus, by identifying the host, the server on the host and the screen on that server, the DISPLAY environment variable specifies a particular display to which it is sending X-protocol commands. Of course, a client may specify more than one display, if necessary. Alternately, the particular display device can be specified by a run string parameter.

Commonly, however, the client software utilizes various extensions to the standard X-Window Language. Accordingly, the display terminals and other hardware components used in the system must also support the specific language extensions utilized by the client software. When such extensions must be supported, it significantly limits the hardware selection available to a system designer. Certain X-extension groups are standardized and well-known. Others can be entirely custom made.

The X-Window Language provides a mechanism by which a single mouse can be used simultaneously in conjunction with a plurality of screens such that a single mouse cursor and keyboard can move between screens. This is known as multi-screen mode.

FIG. 2 generally illustrates a system in which a single keyboard and mouse are used in common with a plurality of screens in X-Window's multi-screen mode. In this example, a host computer 20 is running an operating system 22, such as UNIX. The host computer 20 also is running one or more application programs, such as air traffic control program 24. X-server software 26 interfaces between the screens 28, 30 and 32 and the client program 24. A keyboard 34 and mouse 36 are coupled to the host computer 20.

The keyboard and mouse can be used to enter instructions or data used by the client programs. As previously noted, the keyboard and mouse communicate with the client application program and the display screen through the operating system software layer and the X-server software layer.

In multi-screen mode, multiple screens are driven by a single X-server such that a single mouse cursor can be moved from screen to screen. In other words, with reference to FIG. 2, if the mouse is moved rightward on screen 28 to the right most edge of screen 28, it disappears from screen 28 and appears at the left most edge of screen 30. As the cursor continues rightward across screen 30 and reaches that screen's right most edge, it wraps around and reappears at the left most edge of screen 28 and continues to move rightward across screen 28. The keyboard can be caused to follow the mouse from screen to screen such that operation of keyboard keys effects the screen (and client programs interfacing with the screen) on which the mouse cursor appears.

Some of the problems associated with the use of the multi-screen mode of X-Windows are illustrated in FIG. 3. In FIG. 3, screens 40 and 42 are of two different screen types (e.g., of different sizes and vendors). The host computer includes a graphic controller card 48 and 50 for each screen. Each graphic controller card is provided by the vendor of the display apparatus (screen) which it controls and is different from the other. The X-server includes distinct pieces of driver software 44 and 46 for driving each graphic controller card 48 and 50, respectively. Accordingly, the X-server software must be developed for the particular screen or screens which are to be driven by it. Thus, whenever a screen or graphic card controller is replaced or modified, the X-server software must also be replaced or modified.

In the software industry, and particularly in the graphic display industry, products are updated or replaced on an average of about every two years. Accordingly, it is desirable to have as much isolation between software components as possible so that when one software component is replaced or modified, other software components need not be replaced or modified. However, as illustrated by FIG. 3, whenever a screen or graphic controller is replaced or modified, the X-server software also must be replaced or modified.

Accordingly, it is an object of the present invention to provide an improved graphic display method and apparatus in which keyboards and mice can be shared by various independent display apparatus.

More particularly, it is an object of the present invention to provide an independent graphic display method and apparatus which will allow a single keyboard and/or mouse to be used in conjunction in multi-screen type operation with a plurality of unrelated display terminals.

It is a further object of the present invention to provide an independent graphic display method and apparatus which allows the use of a single keyboard and/or mouse in conjunction with a wide array of display terminals manufactured by different manufacturers without customization of the X-server software for driving the display terminals.

It is yet another object of the present invention to provide an independent graphic display method and apparatus which allows a single keyboard and/or mouse to control a plurality of different display terminals utilizing only the standard X-Window software commands.

SUMMARY OF THE INVENTION

The invention is a method and apparatus for allowing a single keyboard and/or mouse associated with a first work station to be used in multi-screen type operation with a plurality of non-uniform display terminals (screens) coupled to a plurality of X-servers resident on a plurality of work stations. For example, when a user manipulates a mouse to cause a mouse cursor to move across a first display terminal from left to right, the cursor will eventually reach the right hand edge of that display. Normally, the mouse cursor stops moving rightward when it reaches the right edge of the display, even if the user continues to move the mouse rightward. In the present invention, however, a software construct causes the mouse cursor to disappear from the first display and appear at the left most edge of a second display and continue moving rightward across the second display. The keyboard automatically follows the mouse cursor to the new screen such that operation of the keyboard will affect the data displayed only on the screen within which the mouse cursor currently appears.

A piece of software (hereinafter termed the peripheral manager software) separate from any X-server software or display control software runs on one particular work station, to provide such operation.

Each X-server includes a driver for driving one or more graphic controller cards. Each card is associated with one of the screens. Each X-server also is coupled to one or more client programs, such as an air traffic control program. One of the display screens is selected as the primary screen, all other screens being considered secondary screens. The peripheral manager software is treated by the X-servers as another client program. When the cursor is on the primary screen, the mouse and keyboard communicate with the client programs and the display through an X-server in an essentially normal fashion, with the peripheral manager merely observing the X-events from the X-server which relate to the cursor entering a predefined transition window on the screen. A transition window is all or a portion of an edge of the screen which has been defined as a boundary between the screen and another screen.

If and when the cursor enters a transition window to a secondary screen, the peripheral manager issues a GRAB keyboard command and a GRAB mouse command to the X-server for the primary screen, thus intercepting all keyboard and mouse events and not allowing any other client to receive them.

It then masks the cursor on the primary screen in order to make it disappear from the primary screen and draws a mouse cursor and positions it at the appropriate location on the secondary screen. It also simulates all received mouse and keyboard events intercepted from the primary screen X-server and sends them to the X-server associated with the secondary screen. The X-server associated with the secondary screen could be the same X-server which is associated with the primary screen. In such cases, the screen ID portion of the command is changed in order to identify the secondary, rather than the primary, screen.

Even further, the peripheral manager repositions the now invisible cursor on the primary screen to the same relative position as the point it appears on the secondary screen. This last function is performed because the cursor movement will continue to be tracked by the peripheral manager on the primary screen and be simulated to the secondary screen. Accordingly, the invisible cursor on the primary screen must correspond in relative position to the visible cursor on the secondary screen.

If the primary and secondary screens do not have identical size and resolution, the scale of the simulated events relative to the original events may be adjusted.

The X-server for the secondary screen essentially believes it is receiving keyboard and mouse events in a normal fashion. All keyboard and mouse events are being intercepted from the X-server of the primary screen by the peripheral manager, and simulated to the X-server for the secondary screen. Since the cursor on the primary screen is now masked to be invisible, the user does not see any mouse cursor movements on the primary screen, but only on the secondary screen.

The X-server for the secondary screen sends out data to the secondary screen as well as to all client programs which would normally receive the data from that X-server if it were receiving a normal stream of keyboard and/or mouse data.

Additional secondary screens also can be included in the system such that, for example, the cursor can transition from the secondary screen to a third screen (another secondary screen).

The transition windows between any two screens can be arbitrarily defined in a mapping table so that the mouse cursor may transition from any position on one screen to any position on another screen. Accordingly, screens may be placed in any orientation to each other and the cursor can transition from screen to screen in a natural looking fashion.

The software of the present invention utilizes only the basic commands of the standard X-Window protocol and, therefore, can support any display terminal compatible with X-Windows. The various display terminals on a given system may be entirely unrelated and from different vendors as long as they all support standard X-Window Language protocol.

BRIEF DESCRIPTION OF THE DRAWINGS

FIGS. 9A, 9B, 9C and 9D are pictorial representations of pixel maps illustrating how the mouse cursor is drawn and undrawn on a display screen.

DETAILED DESCRIPTION OF PARTICULAR EMBODIMENTS OF THE INVENTION

Figure 1:
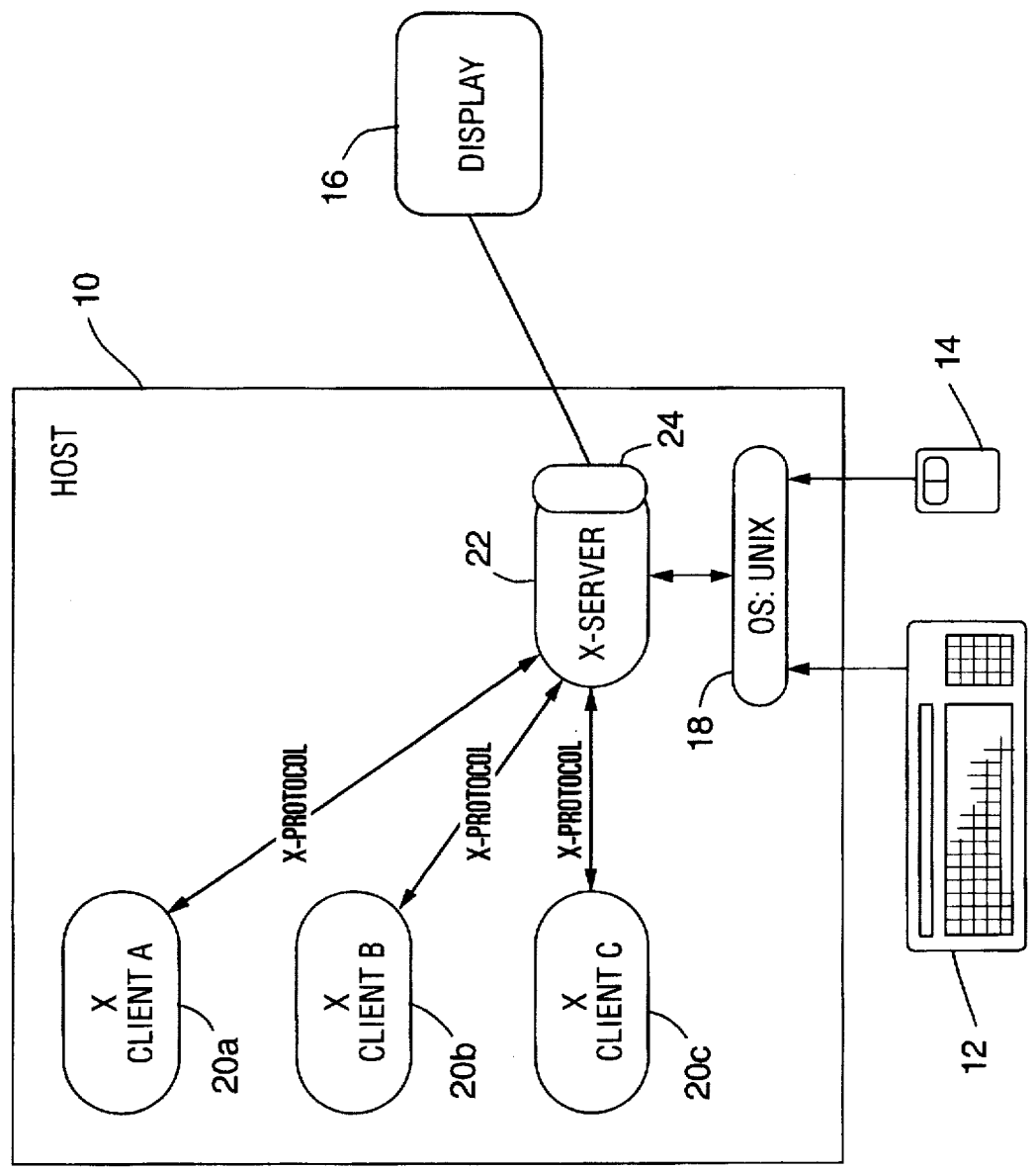
FIG. 1 is a software block diagram of an exemplary work station of the prior art running a plurality of client programs and using X-Windows.
Figure 2:
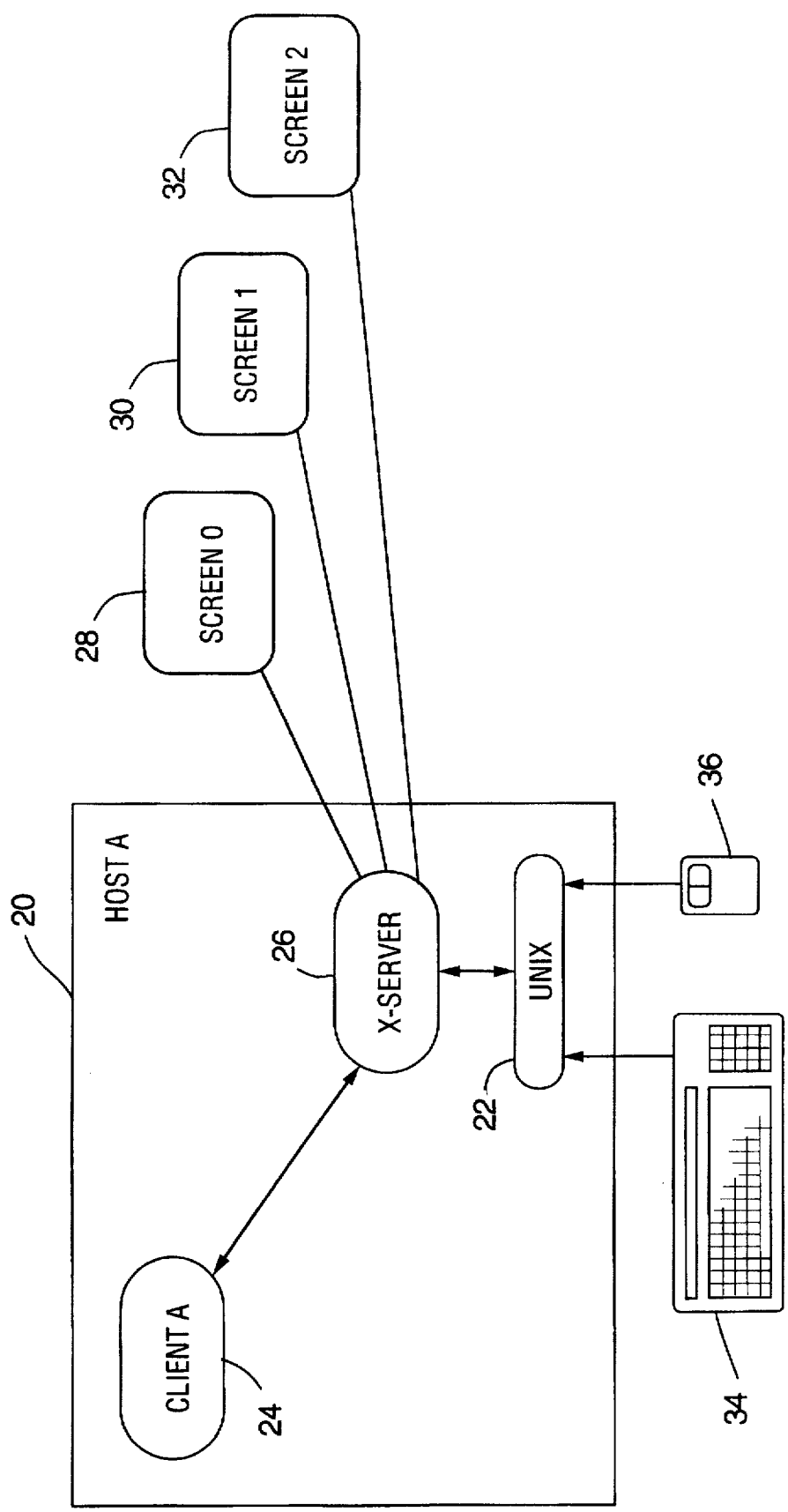
FIG. 2 is a software block diagram of an exemplary work station of the prior art running a plurality of client programs and using X-Windows in multi-screen mode.
Figure 3:
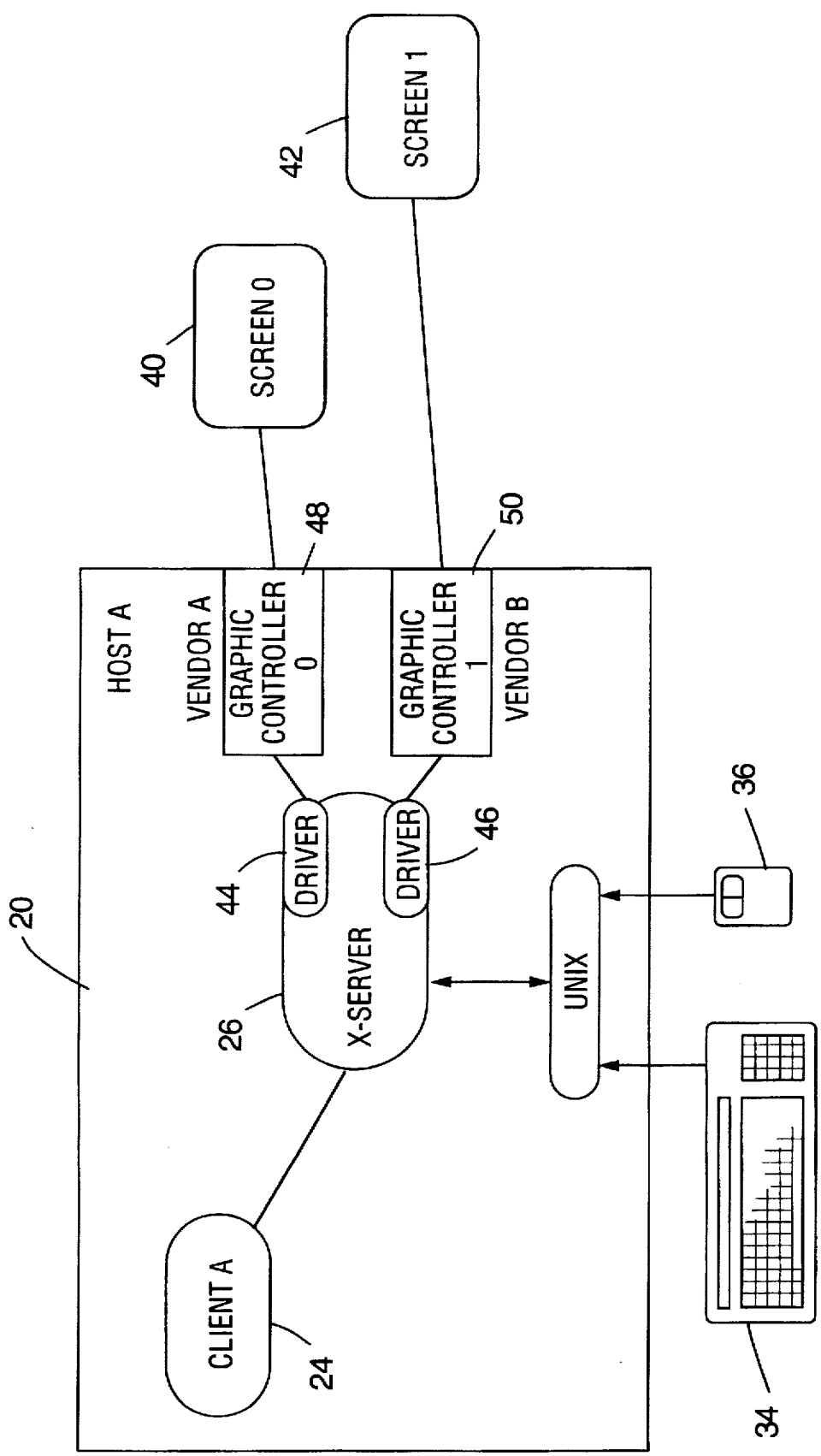
FIG. 3 is a more detailed software block diagram of a work station of the prior art running a client program and using X-Windows to drive two screens in multi-screen mode.
Figure 4:
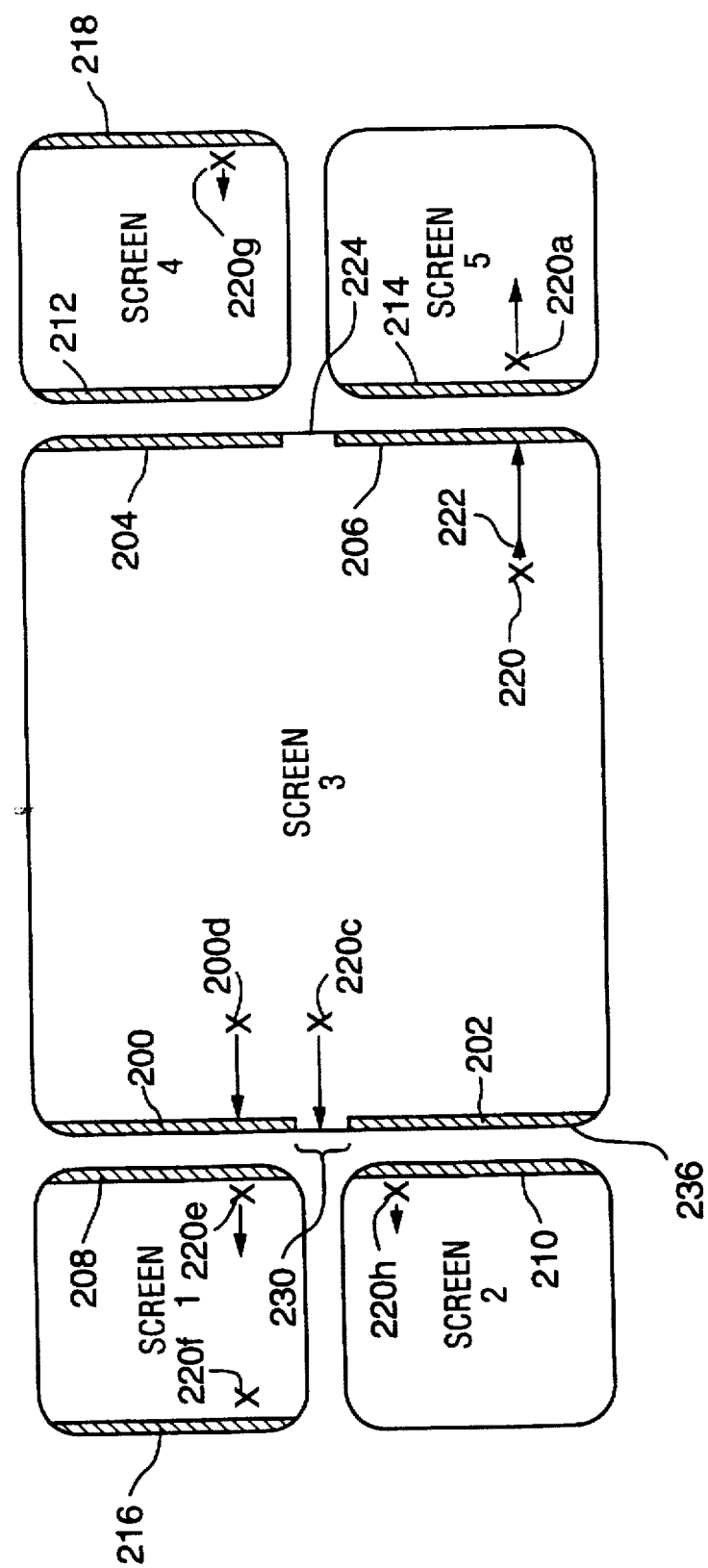
FIG. 4 is a pictorial representation of a multiple screen display.

The term "multi-screen operation" is used herein to identify the type of multiple screen sharing of the keyboard and mouse which is achieved by the present invention. FIG. 4 helps illustrate this concept. FIG. 4 shows the screens of five distinct display apparatus arranged on a wall. In multi-screen operation, transition windows, such as transition windows 200, 202, 204, 206, 208, 210, 212, 214, 216 and 218 are defined. A mouse cursor 220 is represented by an X in FIG. 4 and is associated with a single mouse. The cursor can be moved across the screens such that, for example, as the mouse cursor is moved rightward, as illustrated by arrow 222, and it reaches the right most edge 224 of screen 3, a portion of which edge is defined as a transition window 206, rather than stopping at that edge, the cursor disappears from screen 3 and appears at position 220a on screen 5. Thus, transition window 206 on screen 3 and transition window 214 on screen 5 are mating transition windows.

If the operator of the mouse continues to move the mouse rightward, the cursor continues to move rightward across screen 5.

As will be described in greater detail below, the peripheral manager software of the present invention maintains a table of mating transition windows needed for the above-described mouse cursor operation. As will become clear, the mating transition windows can comprise any portion or all of a screen edge. For instance, the portion of the left edge 236 of screen 3 identified with reference numeral 230 in FIG. 4, is between transition windows 200 and 202. Accordingly, if the cursor shown at position 220c is moved horizontally leftward to encounter portion 230 of the left edge 236 of screen 3, it does not enter any transition window and would behave as a normal mouse cursor. That is, it would stop moving leftward even if the mouse operator continued to move the mouse leftward. If, however, the mouse operator moved the mouse upward to position 220d and moved it leftward, the mouse cursor would enter transition window 200 and disappear from screen 3 and appear at position 220e in screen 1 and continue to move leftward. Even further, as the cursor continued to move leftward on screen 1 and it reached position 220f at transition window 216, if transition windows 216 and 218 are defined as mating transition windows, the cursor would reappear at position 220g on screen 4 and continue to move leftward on screen 4.

Accordingly, the transition windows which mate with each other are arbitrarily definable. Thus, if for some reason, when the cursor reached position 220f in screen 1, it was desired for it to disappear from screen 1 and appear at position 220h on screen 2, rather than 220g on screen 4, this operation could be implemented. The appropriate transition function merely needs to be defined by the peripheral manager. For instance, in FIG. 4, there is no transition window at the top or bottom of any screen. However, if desired, the transition windows could be defined at any position of any screen.

Figure 5:
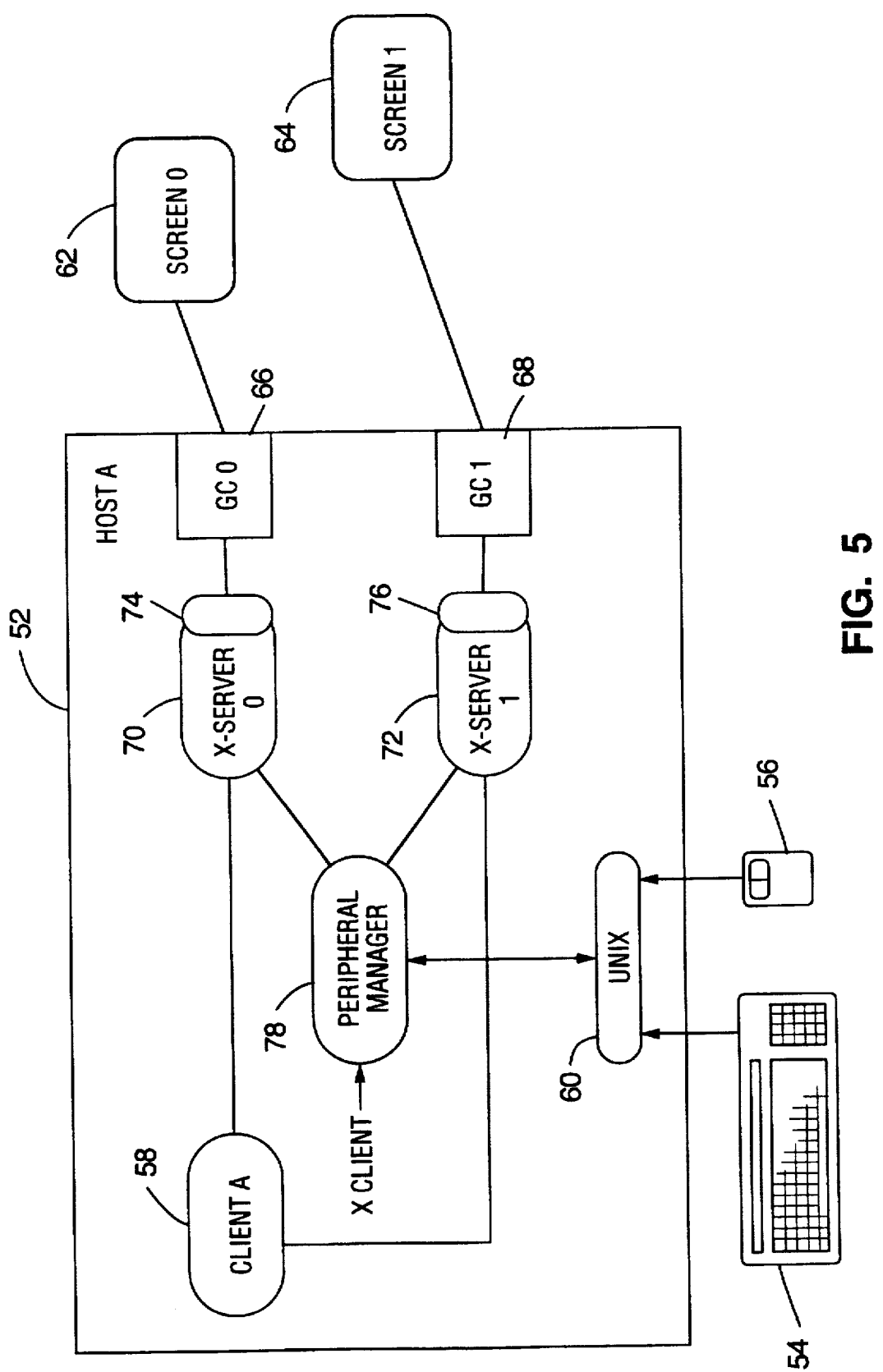
FIG. 5 is a software block diagram of an exemplary embodiment of the present invention.

The invention comprises a piece of software hereinafter termed a peripheral manager. FIG. 5 illustrates the logical operation of a work station utilizing the present invention to provide multi-screen type operation in which a single keyboard and/or mouse can be used with multiple screens.

A host work station 52 has associated with it a keyboard 54 and a mouse 56 for entering data and instructions to an application program, such as program 58. Client program 58, for instance, is an air traffic control program as previously described. The host computer 52 is running an operating system 60, for example UNIX. Two display terminals 62 and 64 are run from graphic controller cards 66 and 68, respectively.

The graphic display language and protocol for the preferred embodiment of the invention is X-Window. This particular graphic display language and protocol is a standard language and protocol maintained by the Massachusetts Institute of Technology and is fully described in O'Reilly & Associates, Inc., *Xlib Programming Manual*, 3d Edition, Adrian Nye (Editor) and O'Reilly & Associates, Inc., *Xlib Reference Manual*, 3d Edition, Adrian Nye (editor), both of which are incorporated herein by reference. The following description assumes a working knowledge of X-Window protocol and language.

Each graphic controller card 66 and 68 interfaces with X-server software 70 and 72, respectively. The X-server software normally receives X-Window commands from client programs and cursor control data from the mouse and converts them into control signals understandable by the associated graphic controller card 66 or 68.

In order to best illustrate the features and advantages of the present invention, the two display apparatus 62 and 64 are presumed to be made by different vendors and are of different sizes and resolutions. Accordingly, the graphic controller cards 66 and 68 which provide the interface between the display apparatus and the X-servers, differ from each other in size, resolution and manufacturer.

An X-server is a piece of software which, among other things, receives commands and issues events in the X-Window protocol and language. It also converts commands and cursor movement data into a form understandable by the graphic controller cards for causing a display apparatus to generate a particular display. Generally, and as used herein, X-protocol data transmitted by an application program are termed X-commands, while unsolicited X-protocol communications transmitted from an X-server to an application program are termed X-events. (Sometimes an application program requests data from an X-server: the response from the X-server is not considered an event, but a response to the query). The data received from input devices such as keyboards and mice (and from which an X-server may generate events for transmission to the application programs) is not X-protocol communication.

The present invention is meant to operate with commercially available display apparatus and graphic controller cards. Accordingly, the detailed operation and interfacing of graphic controller cards with their respective display apparatuses is not discussed herein.

The X-server software blocks 70 and 72 include drivers 74 and 76 for driving the graphic controller cards 66 and 68, respectively. The X-server software blocks 70 and 72 also recognize the client programs to which events should be directed and forward the various events to the appropriate client programs which should receive those events.

Particularly, upon initialization, each client program registers itself with one or more X-servers from which it needs to receive events. More particularly, each client tells the relevant X-server or servers the X-Window event types it wishes to have forwarded to it. The X-server stores in a table a list of the clients which are coupled to it and a list of the event types each of those clients has requested to have forwarded to it.

A peripheral manager software block 78 interfaces with the X-servers. In this embodiment of the invention, the data from the keyboard and mouse are sent to the peripheral manager 78, rather than directly to an X-server. As illustrated in FIG. 5, the keyboard 54 and mouse 56 interface with the peripheral manager 78 through the operating system layer 60. The peripheral manager 78 keeps track of the display apparatus on which the mouse cursor currently appears as well as the exact position on that display of the mouse cursor.

The peripheral manager sends the keyboard and mouse data received through the operating system layer 60 to the X-server 70 or 72 associated with the display 62 or 64 upon which the mouse cursor currently appears and does not send such events to any other X-servers.

The peripheral manager constantly tracks the position of the mouse cursor. It also maintains a record of the one or more transition windows for each of the screens. Transition windows are areas on the screen (usually an edge) where, when the mouse cursor enters that area, it is to disappear from the screen and appear on another screen. Each transition window has a mating transition window on another screen where the cursor is to appear when it disappears from the first screen.

When the mouse cursor enters a transition window, the position of the mouse cursor as stored by the X-server is overwritten with a new location corresponding to the position on the new screen where the mouse cursor is to appear when it enters the particular transition window. Thereafter, the peripheral manager simulates X-events corresponding to the received data from the keyboard and mouse to the X-server associated with the new screen rather than the old screen. Alternately, the peripheral manager could simply forward the data received from the cursor and/or keyboard to the X-server, rather than first generating X-events for forwarding.

When the peripheral manager observes that a mouse cursor has entered a transition window, it causes the position of the mouse cursor, as stored by the X-server, to be overwritten with a new location corresponding to the position on the new screen where the mouse cursor is to appear when it enters the particular transition window. Thereafter, the peripheral manager simulates X-events corresponding to the received data from the keyboard and mouse to the X-server associated with the new screen rather than the old screen. Alternately, the peripheral manager could simply forward the data received from the cursor and/or keyboard to the X-server, rather than generating X-events for forwarding. In either embodiment, the cursor disappears from the first screen and appears in an appropriate location on the second screen.

If the primary and secondary screens do not have identical size and resolution, the simulated cursor movement events may need to be scaled.

The X-servers do not know or care from where they are receiving the X-events (or keyboard and mouse data in the alternate embodiment). As in normal operation, the X-server which receives the events checks its tables to determine if any of the clients which are coupled to it are to receive the events and sends appropriate events to the appropriate clients. It also drives its display according to the simulated events.

It should be understood that any and all of the software blocks illustrated in FIG. 5 can be resident on different work stations. For instance, X-server 70 and X-server 72 may be on different work stations (as long as they are coupled together through a communication channel such as a local area network). It also should be understood that, although FIG. 5 illustrates two screens, the number of screens as well as the transition windows can be arbitrarily set.

Further, although FIG. 5 illustrates only a single client application program 58, any number of client programs on any number of work stations could be coupled to any number of X-servers. For instance, several client application programs could be coupled to any single X-server, could be registered to receive the same or different event types, and could send X-Window commands to the same X-server. For instance, FIG. 6 illustrates an embodiment of the invention in which client programs running on work station A and an additional client program running on work station B communicate with a single X-server running on work station B.

Figure 7:
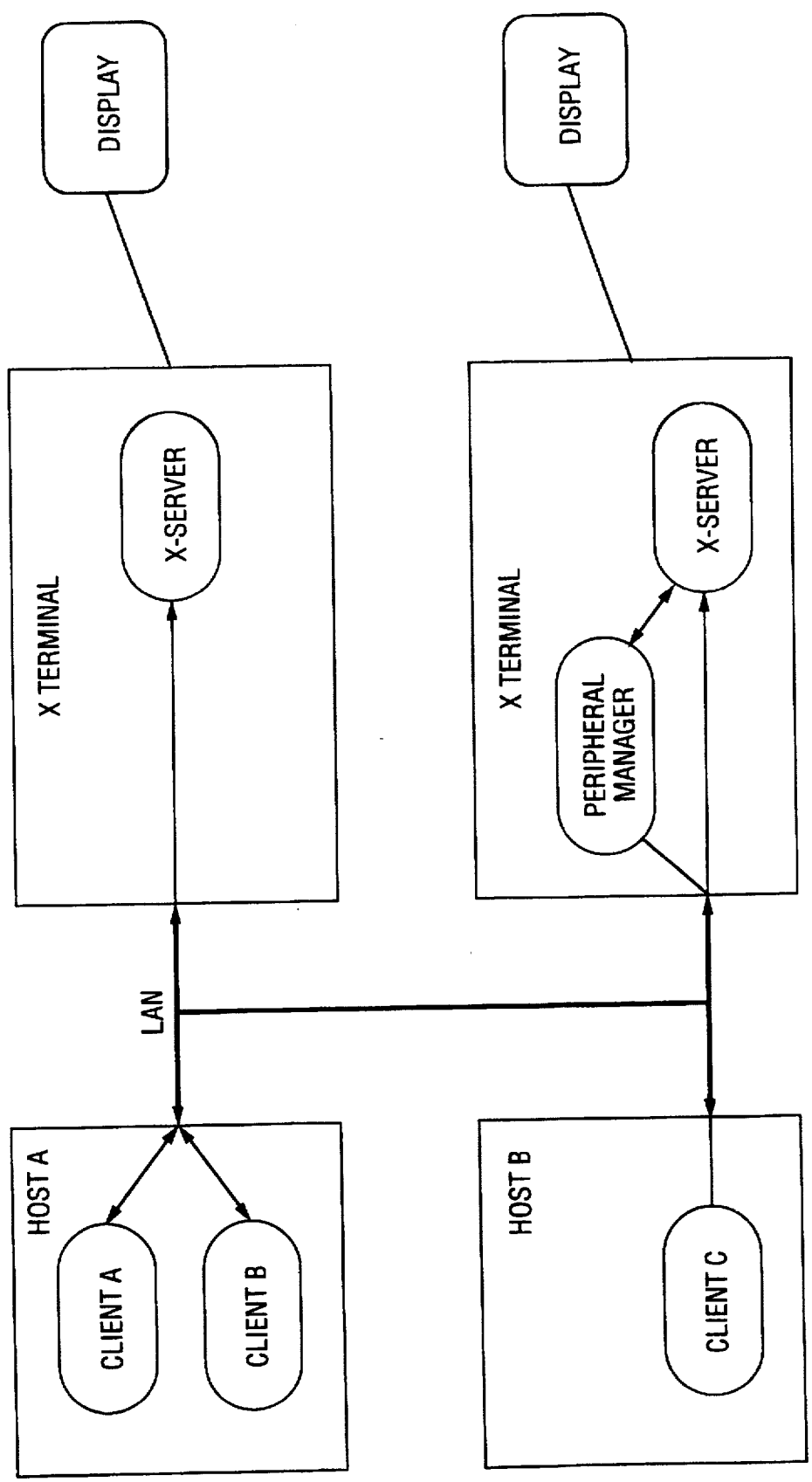
FIG. 7 is a software block diagram illustrating a second alternate embodiment of the present invention.

FIG. 7 illustrates an embodiment of the invention in which client programs A and B running on work station A and client program C running on work station B are coupled to two X-servers running on independent X-terminals. The communication between the separate X-terminals and work stations are made through a LAN.

Figure 6:
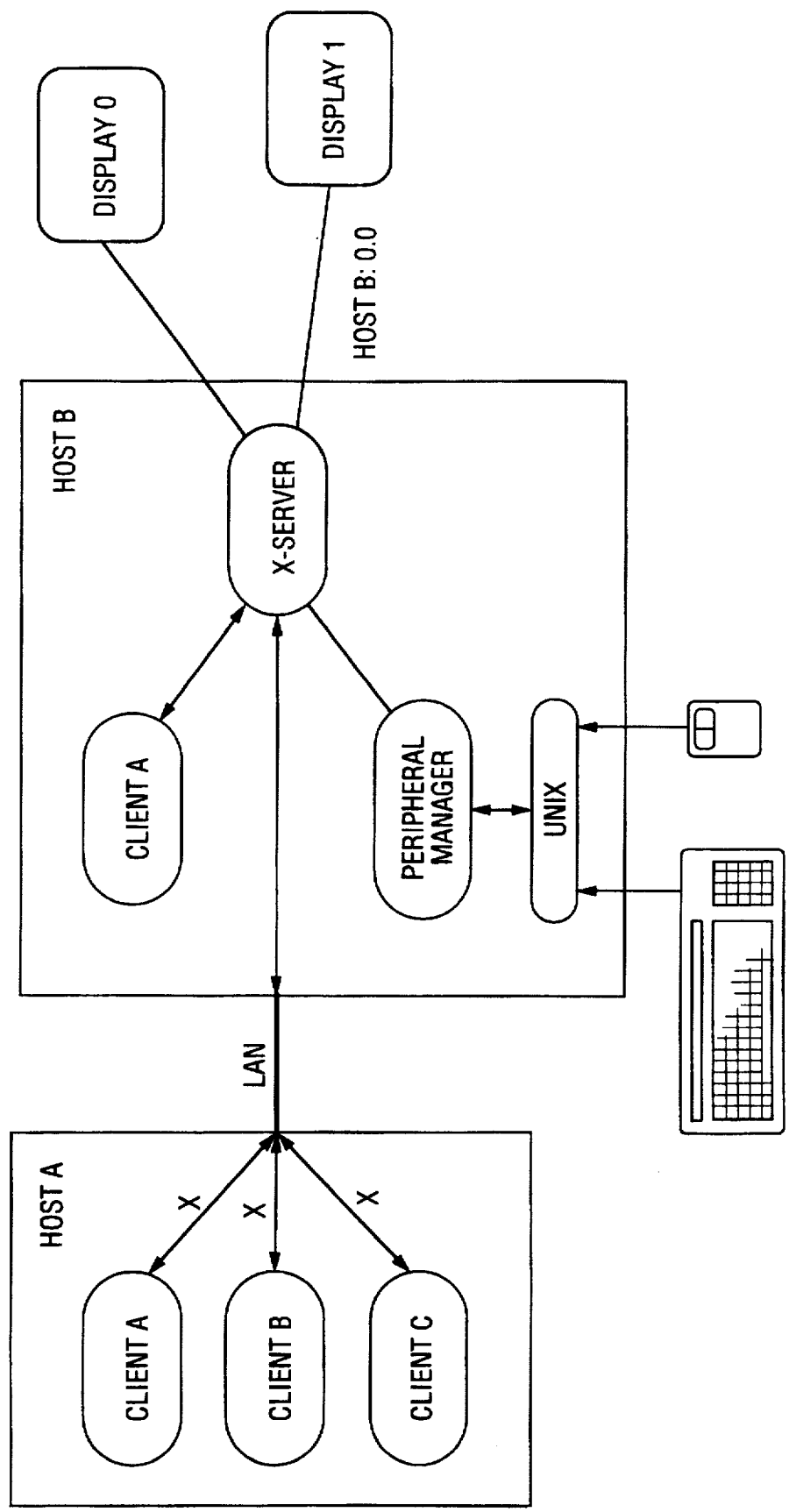
FIG. 6 is a software block diagram illustrating a first alternate embodiment of the present invention.
Figure 8:
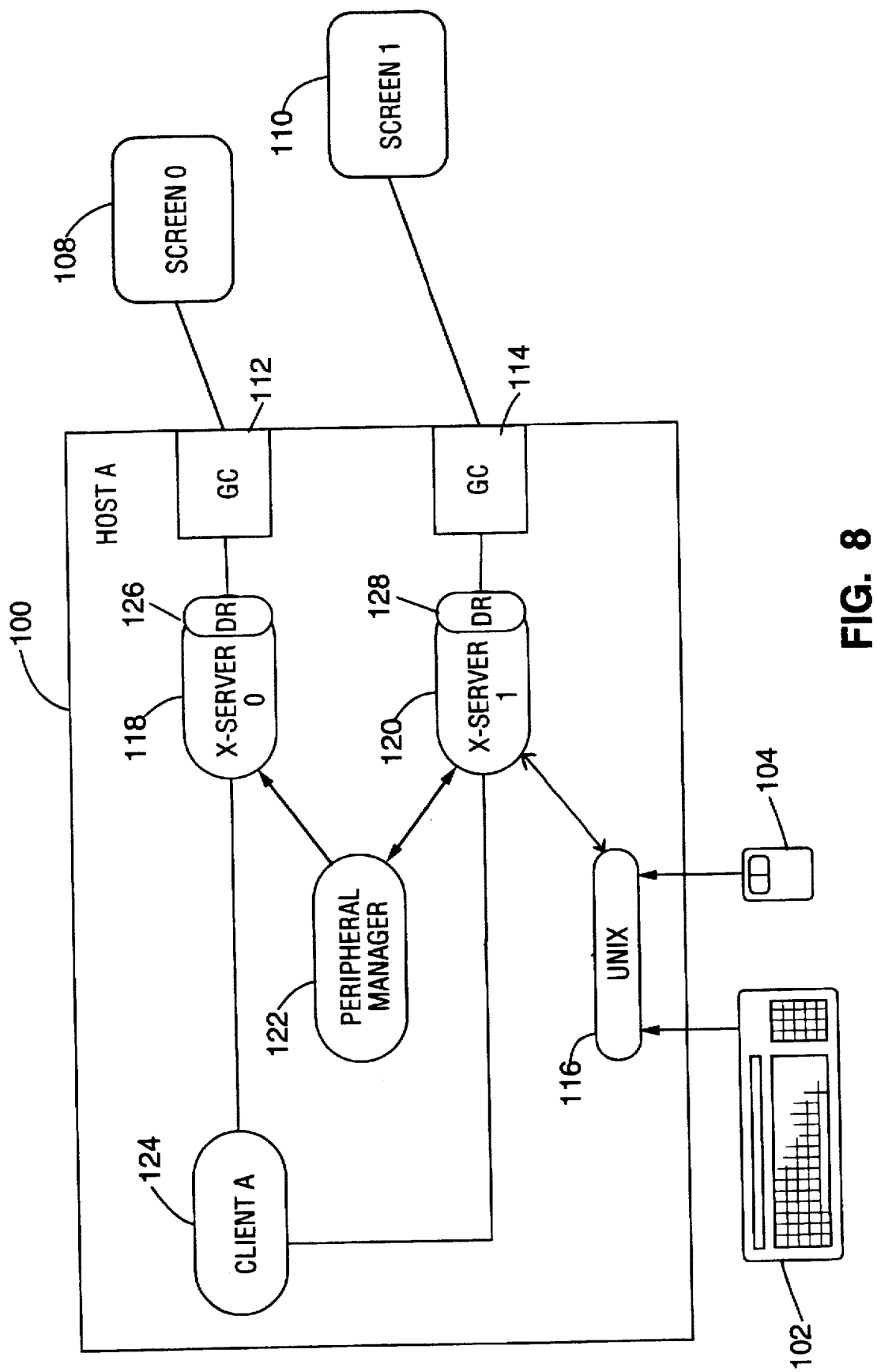
FIG. 8 is a software block diagram illustrating a third alternate embodiment of the present invention.

The embodiments of the invention illustrated by FIGS. 5–7 logically represent different manners in which the invention can be practiced. FIG. 8 shows an embodiment of an actual preferred implementation of the invention. As can be seen from a comparison of FIGS. 5 and 8, the embodiments are substantially identical except that the keyboard 102 and mouse 104 in FIG. 8 are coupled, through UNIX layer 116, directly to X-server 120, rather than to the peripheral manager 122. Operation is essentially the same as that described above with respect to FIG. 5 except that the stream of data from keyboard 102 and mouse 104 are received by X-server 120 (hereinafter termed the primary X-server) rather than peripheral manager 122.

In this embodiment of the invention, the peripheral manager registers an event mask with the primary X-server so that it will receive information as to when the mouse cursor enters a transition window. When the cursor appears on primary screen 110 (associated with primary X-server 120), the peripheral manager 122 wants to receive all ENTER WINDOW events from the X-server. Particularly, the X-Windows protocol and language allows for the definition of windows. Accordingly, the transition windows are easily designated and defined in X-Window. The X-Window protocol and language also provides an ENTER WINDOW event which is issued by the X-server when the cursor enters a defined window. As will be described in greater detail below, when the cursor is on the primary screen, the peripheral manager does not perform any function unless and until the cursor enters one of the transition windows (i.e., until the peripheral manager receives an ENTER WINDOW event from the X-server). When the cursor is on the primary screen 110, the peripheral manager needs to receive only ENTER WINDOW events and determine whether window which was entered is a transition window. Accordingly, peripheral manager 122, which is basically a client program to primary X-server 120, upon registration, creates an event mask with primary X-server 120 so that it receives only ENTER WINDOW events associated with certain windows on the screen, namely, the predefined transition windows.

Thus, when the mouse cursor enters a transition window on the primary screen 110, the X-server 120 notifies the peripheral manager 122 by sending it an ENTER WINDOW event. Responsive to this, the peripheral manager enters a second mode of operation, termed the GRAB mode. In this mode, the peripheral manager 122 issues a GRAB keyboard command and a GRAB mouse command. In this mode, the peripheral manager receives all keyboard and mouse events generated by the primary X-server responsive to data received from the keyboard and mouse. The GRAB commands prevent primary X-server 120 from sending keyboard and mouse X-events anywhere but to the device which issued the GRAB commands, i.e., the peripheral manager 122. Thus, when the mouse cursor enters a transition window, the peripheral manager 122 grabs all mouse events and keyboard events, thus preventing primary X-server 120 from sending them to any other clients.

After issuing the GRAB keyboard and GRAB mouse commands, the peripheral manager first causes several things to occur. Particularly, the peripheral manager causes the cursor on the primary screen to become invisible, and causes the cursor on the secondary screen to appear at the appropriate position in the new screen 108. These two operations, however, are more complicated than may appear at first. Particularly, even though the cursor will now be invisible on primary screen 110, the mouse and keyboard data stream is still received directly from the mouse and keyboard by primary X-server 120. Cursor movement will be tracked on primary screen 110 by peripheral manager 122 by requesting all pointer motion events from primary X-server 120. Those movements are then simulated by peripheral manager 122 and sent to X-server 118, serving secondary screen 108, using WARP POINTER commands.

Accordingly, when the cursor enters a transition window, it is repositioned on primary screen 110 to a position corresponding to the position on which it is now to appear on secondary screen 108 by using the table of predefined mating transition windows and a transition function for that window for defining where the cursor is to appear relative to the mating transition window on the new screen. This new information replaces the old cursor position information maintained by the peripheral manager. Further, if primary screen 110 and secondary screen 108 are of different sizes or different resolutions, peripheral manager 122 must perform a scaling function when simulating the cursor movements on primary screen 110 to X-server 118 for display on new screen 108. This is a simple matter of providing a scaling factor to any WARP POINTER commands before issuing them.

Although the cursor is still tracked on primary screen 110 (because the cursor events are coming from the primary X-server), the user is to see the cursor only on the new screen 108. Accordingly, the cursor on screen 110 must be made invisible. This is done by masking the cursor as will be described in greater detail below.

As long as the cursor is on a screen other than the primary screen, all keyboard and mouse events are intercepted by the peripheral manager from primary X-server 120 and are simulated and sent to X-server 118. As far as X-server 118 is concerned, it is not aware of the peripheral manager layer 112 and does not know or care from where it is receiving the keyboard and mouse events.

While in GRAB mode, if the peripheral manager observes that the mouse cursor has entered a transition window in the secondary screen which returns it to primary screen 110, it simply updates its current screen data, releases the GRAB keyboard and GRAB mouse commands and goes back to the previously described operation in which it merely observes the ENTER WINDOW events.

If, however, the cursor were to enter a transition window from the secondary screen 108 to a third screen (not illustrated in FIG. 8), operation would continue in the GRAB mode, but the current screen data and cursor position data in the peripheral manager would be updated again just as described with respect to when the cursor entered the transition window between the master screen 110 and secondary screen 108. The cursor would now appear on the third screen instead of the second screen. However, operation in GRAB mode remains essentially unchanged to that described above, except for the fact that the simulated X-events are being sent to a third screen now rather than the second screen. The scaling factor may be modified also, if the third screen has a different size or resolution that the second screen.

The FIG. 8 embodiment also can be adapted for use with screens and X-servers on different work stations connected over a LAN or the like, as was illustrated by the alternate embodiments of the invention shown in FIGS. 5–7. Even further, the embodiment of FIG. 8 can be easily adapted to a system in which multiple screens are served by a single X-server. Such a system operates essentially as described with respect to FIG. 8, except, rather than changing the X-server variable of the DISPLAY command in the simulated X-command and event stream, the screen variable is changed.

FIGS. 9A–9D illustrate how a cursor is drawn on a display screen and how the present invention causes it to become invisible when in GRAB mode. A cursor commonly is drawn on a display screen as a combination of a rectangular glyph symbol and a mask. The glyph symbol defines the colors of the cursor using 1 bit per pixel position, wherein a 1 represents a pixel in the current foreground color, and a O represents a pixel in the current background color. If the cursor is to be an X as shown in FIG. 9A, then a rectangular glyph pixel array, such as represented in FIG. 9B, is generated. Next, a mask is typically generated comprising another rectangular pixel array, such as shown in FIG. 9C, in which pixels designated with 1 are drawn in accordance with the glyph specification and pixels designated with 0 are not drawn at all regardless of the glyph array. Thus, in order to cause the cursor to disappear, the mask specification is designated as all zeros, as shown in FIG. 9D. Accordingly, the cursor completely disappears.

In accordance with the present invention, each software block is separate and independent of the other software blocks. Accordingly, replacement of a display apparatus or graphic controller card does not require replacement of the X-server or peripheral manager software. Accordingly, multi-screen operation can be provided for different screens manufactured by different vendors having different sizes and/or resolutions without the need to have custom designed X-server or peripheral manager software for different screens.

Figure 10A:
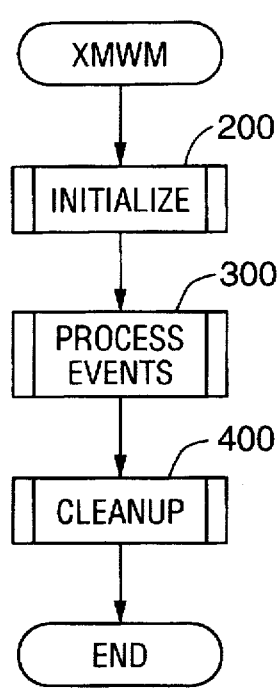
FIGS. 10A, 10B, 10C, 10D and 10E are flowcharts illustrating the operation of the present invention.
Figure 10E:
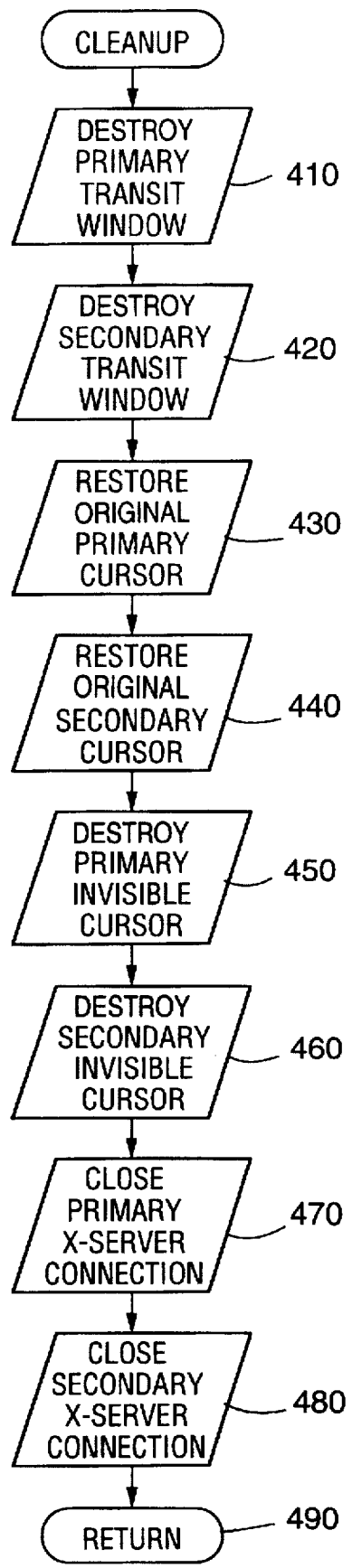
Figure 10B:
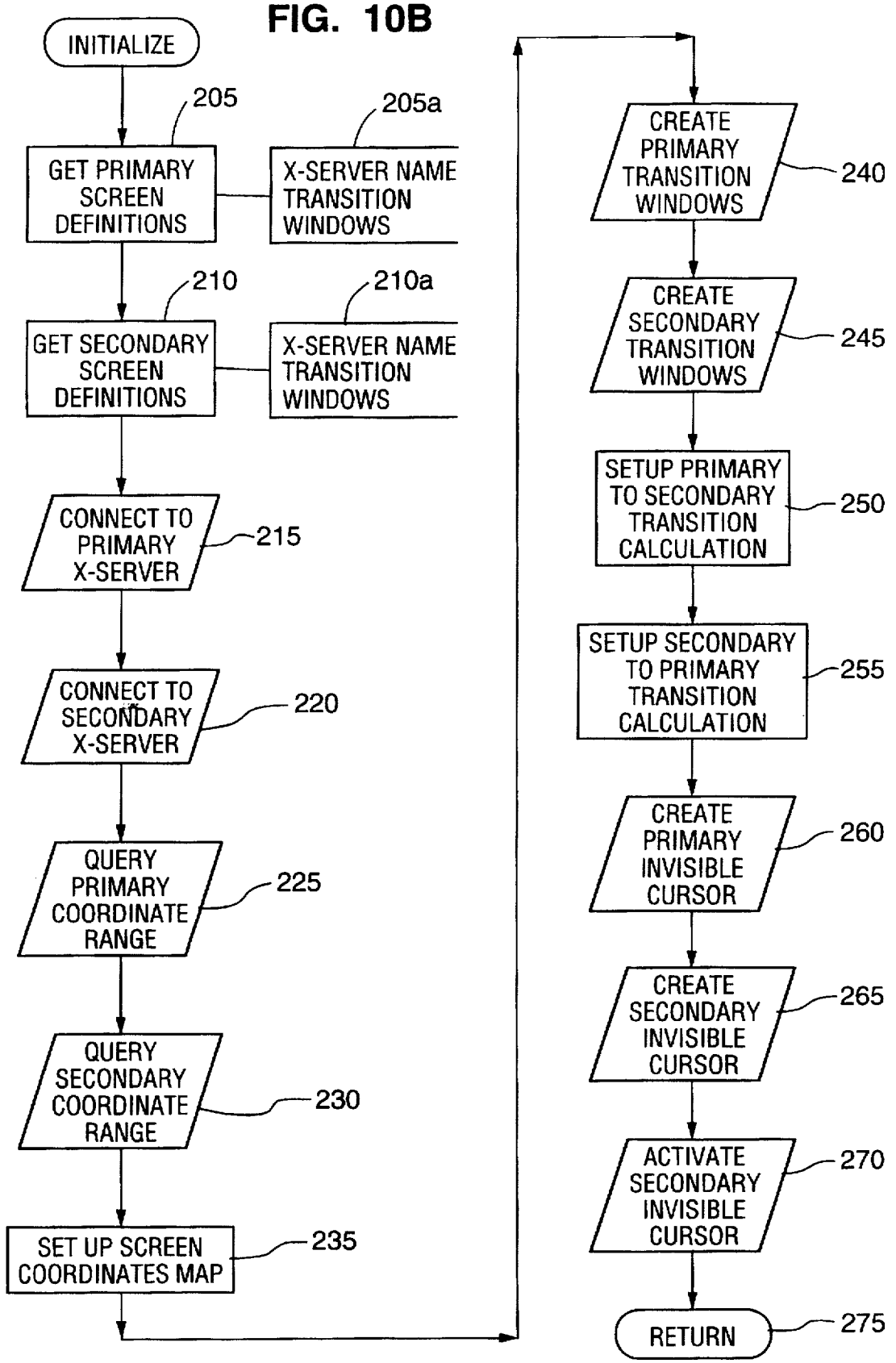
Figure 10C:
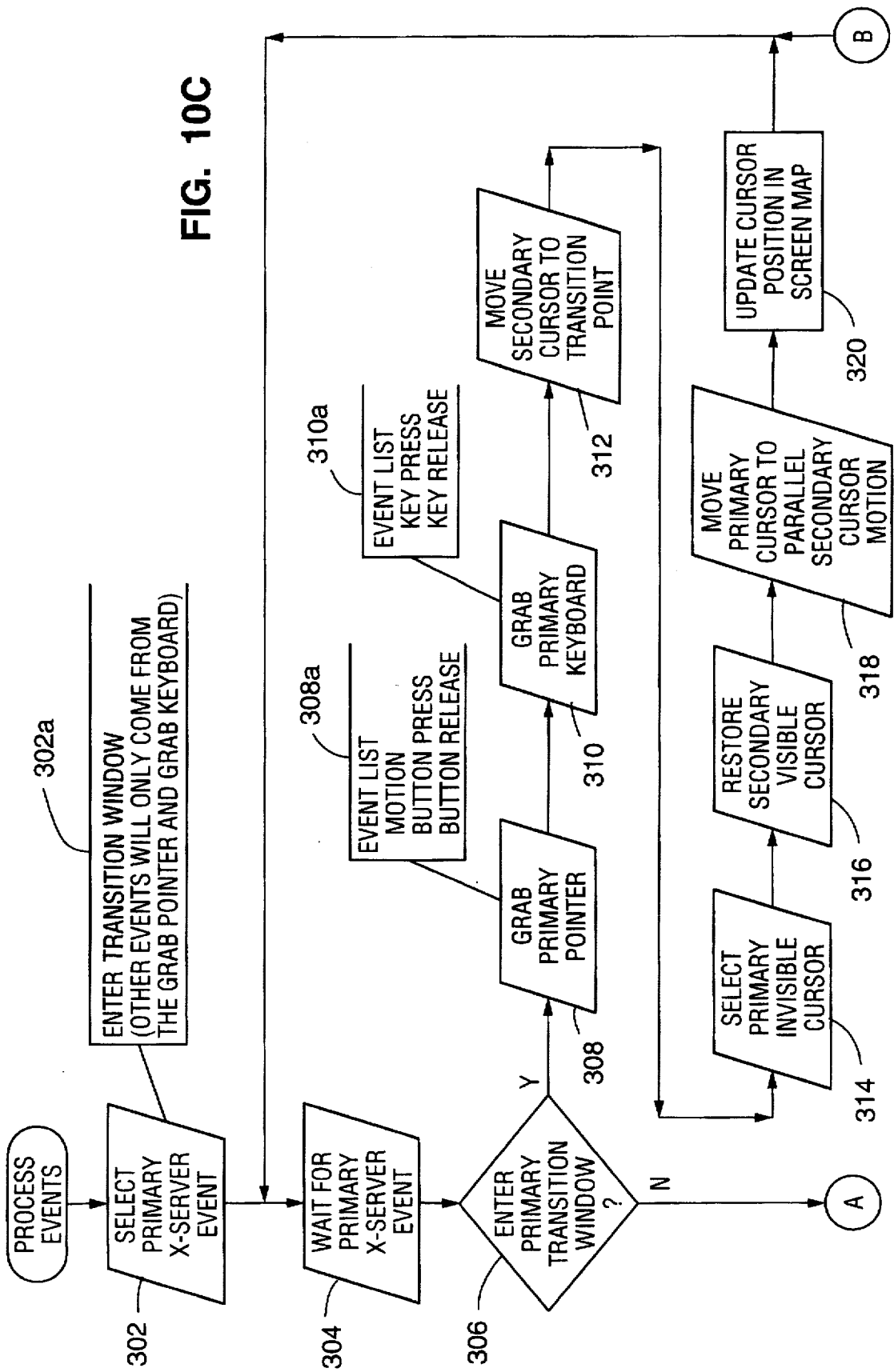

FIGS. 10A–10E are flowcharts illustrating the operation of the peripheral manager software, particularly adapted in accordance with the embodiment of the invention of FIG. 8. FIG. 10A shows that the peripheral manager programming comprises three general routines, including an initialize routine 200, a process events routine 300 and a clean-up routine 400. In the flowcharts of FIGS. 10A, 10B and 10C, the following convention is used. The rectangles with double edged sides (e.g., steps 200, 300 and 400) represent subroutines, the details of which are shown elsewhere in the flowcharts. Regular rectangles represent processes which are performed on the main host embodying the peripheral manager. Parallelograms represent input/output operations. It should be noted that all graphic operations are considered I/O operations since any of the display screens could be on a different work station than the peripheral manager. The diamond shaped boxes represent decision steps. The open-ended boxes are comments relating to the box to which they are connected. The circular steps are simply connectors. Finally, the oval steps represent points of termination, i.e., either a start or an end of a routine.

As illustrated in FIG. 10A, upon power up, the peripheral manager is initialized (step 200). During operation, the peripheral manager processes events as dictated by subroutine 300. Finally, at the end of a multi-screen session, various steps must be taken to clean-up (step 400) the software in order to allow non-multi-screen operation.

FIG. 10B illustrates the initialized subroutine 200 in more detail. In step 205, the primary screen definitions are retrieved. These definitions include the screen descriptor, screen size and resolution, and definitions of the transition windows. Such information would also include the name of the X-server to which connection must be made to communicate with the primary screen.

In step 210, similar definitions for the secondary screen are obtained and recorded. For secondary screens, however, there is additional information. Particularly, the transition windows on the secondary screens are not only defined, but their mating transition window on the primary screen (or other secondary screens) are defined.

In steps 215 and 220, the connections to the primary and secondary X-servers, respectively, are made by use of the open screen commands. Next in steps 225 and 230, the coordinate ranges of the first and second screens are determined. This information is necessary to make the peripheral manager software platform independent and for generating a complete definition of the transition windows so that the cursor can be shared by multiple screens.

In step 235, the peripheral manager sets up a coordinate map of the entire space through which the cursor can move. The transition windows are defined in this coordinate map in steps 240 and 245.

Now that the transition windows are defined in the coordinate map, a function must be defined for repositioning the cursor when it enters a transition window. For instance, when the cursor enters a transition window at the upper righthand corner of a screen, it shall be made to appear at the upper lefthand corner of the secondary screen to the right of the primary screen. This transfer function is defined in step 250. Similar transfer functions are defined for the secondary screens in step 255.

In steps 260 and 265, the pixel maps for making the cursor on the primary and secondary screens, respectively, invisible are defined.

Finally, the cursor should appear on only one screen. Accordingly, in step 270, the secondary invisible cursor routine is activated so that, upon initialization, the cursor appears on the primary screen only.

In step 275, the subroutine ends and processing is returned to the process events subroutine 300.

Figure 10D:
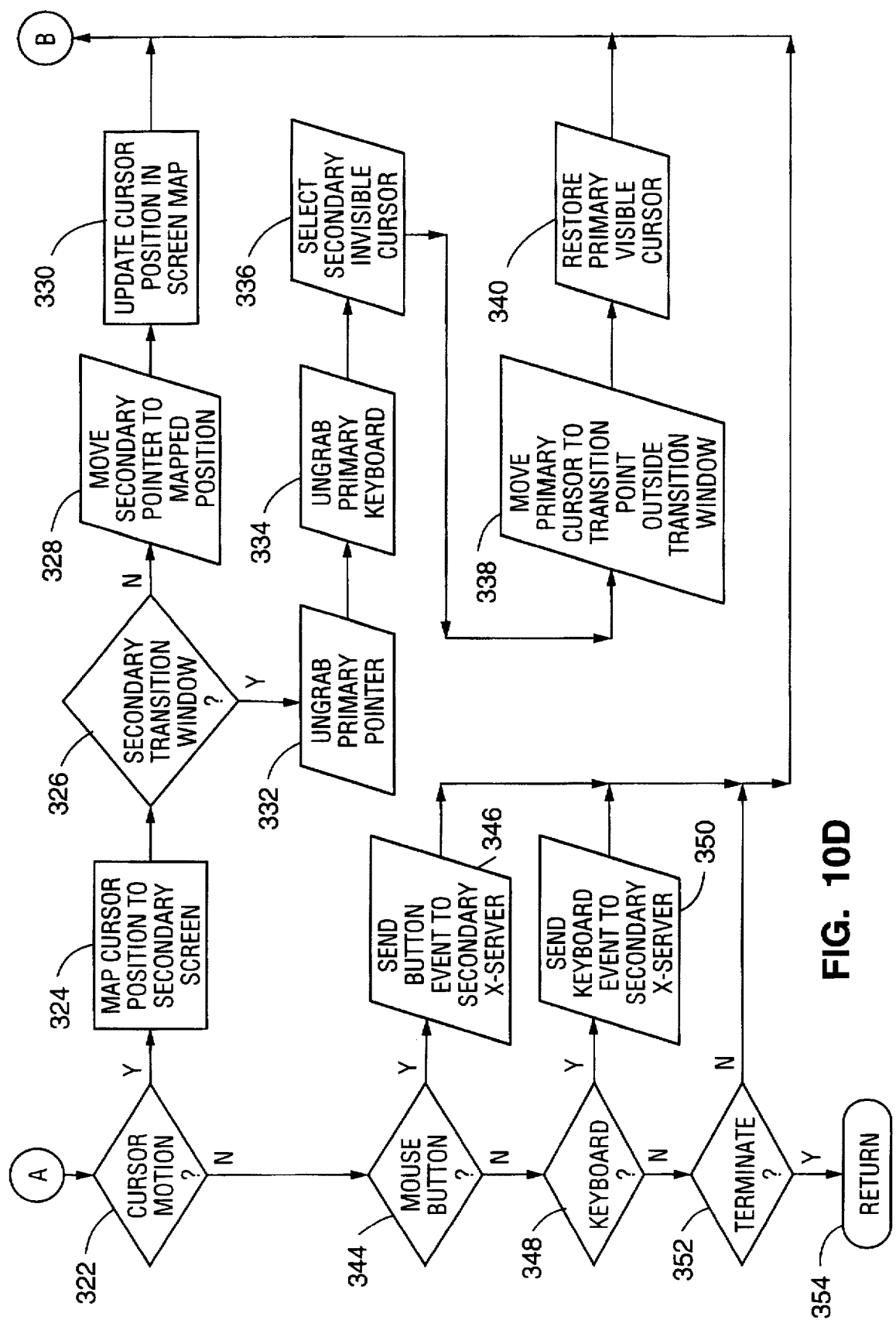

FIGS. 10C and 10D comprise a flowchart illustrating the process events subroutine 300 in greater detail.

In step 302, the peripheral manager registers with the X-servers (creates an event mask) for those events which it wishes to receive. As previously discussed, when the cursor is on the primary screen, the peripheral manager merely observes ENTER WINDOW events for the transition windows. Accordingly, in step 302, the event mask for the peripheral manager is set up to receive from the X-server only the ENTER WINDOW events for the specified transition windows.

In step 304, the program simply waits to receive an ENTER WINDOW command. In step 306, it determines if the cursor has entered a transition window. If so, then the peripheral manager will now want to receive from the X-server all keyboard and mouse events. Accordingly, in steps 308 and 310, the peripheral manager issues a GRAB primary pointer command and a GRAB primary keyboard command, respectively. As noted in boxes 308a and 310a, the peripheral manager will now exclusively receive all motion, button press, and button release events relating to the cursor and the peripheral manager will now exclusively receive all key press and key release X-events issued by the X-server responsive to the keyboard data stream.

In step 312, the secondary pointer is now moved to a particular position on the secondary screen in accordance with the transfer function set up in step 250. In step 314, the primary cursor is made invisible. In step 316, the secondary cursor is made visible.

In step 318, the now invisible primary cursor is moved to a position on the primary screen corresponding to the position of the secondary cursor on the secondary screen. As previously noted, this is necessary because the cursor motion is always tracked on the primary screen and simulated to the secondary screens.

In step 320, the cursor position is updated in the screen map and programming is returned to step 304. However, now that the GRAB primary pointer and GRAB primary keyboard commands have been issued, in step 304, the peripheral manager will react to all mouse and keyboard events.

Now that the cursor is on the secondary screen, the decision in step 306 as to whether the cursor has entered a primary transition window will be NO since the cursor cannot enter a primary transition window from a secondary screen. Accordingly, when an event occurs, programming will flow from step 304 to step 306 to step 322.

In step 322, it is determined if the primary X-server event detected in step 304 was a cursor motion event. If so, programming flows to step 324. In step 324, the motion on the primary screen is mapped to the secondary screen. Next, in step 326, it is determined if the cursor motion has caused the cursor to enter a transition window in the secondary screen. If not, then programming flows to step 328 where the secondary cursor is moved to the mapped position. Thereafter, in step 330, the position of the cursor on the screen coordinate map, which was set up in step 235, is updated and programming returns to step 304.

If, however, in step 326, the secondary cursor did enter a secondary transition window, programming instead flows from step 326 to step 332. In steps 332 and 334, the primary pointer and keyboard are ungrabbed. The action of ungrabbing the keyboard and mouse restores the previous event mask such that the peripheral manager will now receive only ENTER WINDOW events again. In step 336, the secondary cursor is made invisible again. Then in step 338, the primary cursor is moved to an appropriate position on the primary screen corresponding to where it should appear, as dictated by the functions defined in initiation step 255. Only after the primary cursor is positioned to the correct position is it made visible (step 340). Then, programming flows to step 342 where the cursor position is updated in the screen map which was created in initiation step 255. Finally, programming returns to step 304 to wait for another ENTER WINDOW command.

If the visible cursor is in a secondary screen, and the peripheral manager detects a mouse button event in step 304, the programming flows from step 304 through steps 306 and 322 to step 344. In step 344, it is determined that the detected event was a mouse button event and programming flows to step 346. In step 346, the button event is simulated to the secondary X-server and programming returns to step 304.

If, however, the event detected in step 304 was a keyboard event (and the visible cursor is in the secondary screen), then programming flows from step 304 through steps 306, 322 and 344 to step 348. In step 348, it is determined that the event was a keyboard event and programming flows to step 350. In step 350, the keyboard event is simulated to the secondary X-server. Programming then returns to step 304.

If the detected event is none of the above and is not a terminate event, programming flows through steps 304, 306, 322, 344, 348 and 352 to return to step 304.

Finally, if the event which is detected in step 304 is a terminate event, whether the visible cursor is on the primary or secondary screen, programming flows through steps 304, 306, 322, 344, and 348 to step 352. In step 352, it is determined that a terminate event has occurred and programming flows to step 354 which returns to the clean-up subroutine 400.

FIG. 10E illustrates the clean-up subroutine. Particularly, in steps 410 and 420, the primary and secondary transition window data is destroyed. In steps 430 and 440, the original primary and secondary cursors are restored, respectively. In steps 450 and 460, the primary and secondary invisible cursors are destroyed, respectively. Finally, in steps 470 and 480, the connections to the primary and secondary X-servers are closed. In step 490, the peripheral manager routine is ended.

Appendix A hereto is a proof-of-concept, minimal implementation of the peripheral manager software 78 of the present invention for use in a system with a primary screen and one secondary screen (filename xmwm.c). Only completely standard X-Window X115R5 Xlib commands are used. The program is written in generic Kerrigan and Ritchie C-language code. Accordingly, the program is completely platform independent for both the host and the graphics system.

It should be understood that, when in the GRAB mode, the peripheral manager may, if the application calls for it, send the simulated events to more than one X-server. It should also be understood that, should the application call for it, the cursor may be under the control of several mice simultaneously. Likewise, several keyboards may simultaneously be in operation with respect to a single display apparatus. Of course, in most applications it is likely that the peripheral manager will block out the keyboard and mouse associated with the local work station when the cursor associated with the keyboard and mouse of the master work station is appearing on the screen associated with that local work station.

Figure 11:
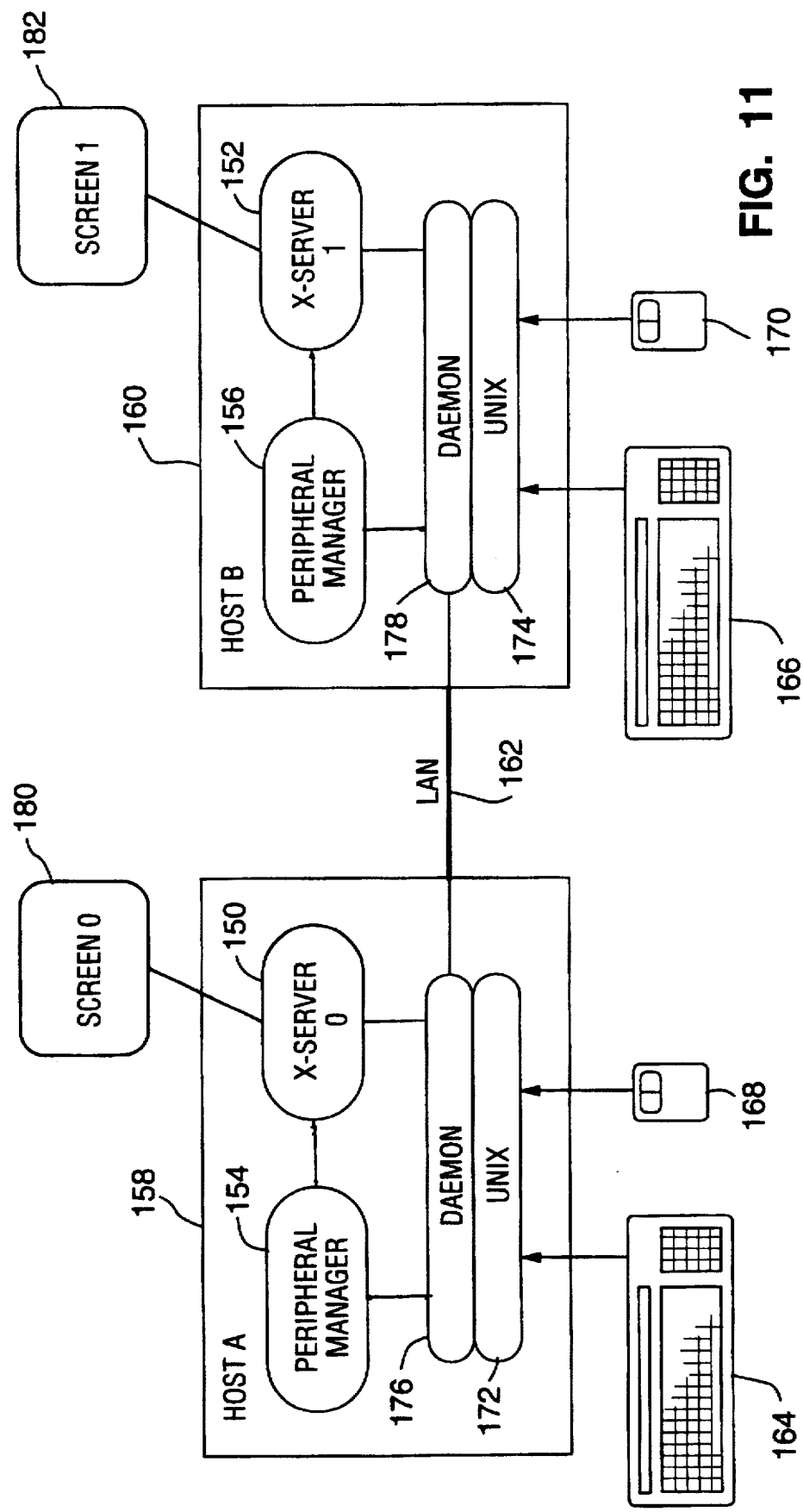
FIG. 11 is a software block diagram illustrating another embodiment of the present invention.

FIG. 11 is a software block diagram illustrating another embodiment of the present invention. In this embodiment, each X-server 150 and 152 has its own peripheral manager 154 and 156. By way of example, the X-servers 150 and 152 are shown on two separate work stations 158 and 160, respectively, and they are connected over a LAN 162. However, the X-servers may be on the same work station. As before, the keyboards and mice 164, 166, 168 and 170 communicate with their respective local X-servers 150 and 152 through the UNIX layers 172 and 174. However, instead of the UNIX layer 172 or 174 forwarding the events directly to the associated X-server 150 or 152, there is a daemon layer 176 or 178 between the UNIX layer and the X-server. The daemon also interfaces with the associated peripheral manager 154 or 156 as explained below. Further, the daemons are coupled to each other over the LAN.

In operation, each peripheral manager registers with its associated X-server to receive the ENTER WINDOW events for transition windows in the associated display. When the peripheral manager receives information that the cursor has entered a transition window in the associated display, it commands the associated daemon to redirect the keyboard and mouse data streams over the LAN to the daemon associated with the screen and X-server to which the cursor must transition. Accordingly, if an operator is operating mouse 168 on screen 180 and peripheral manager 154 observes that the mouse cursor entered a transition window which transitions between screens 180 and 182, it instructs daemon 176 to send the mouse and keyboard data streams from mouse 168 and keyboard 164 over the LAN 162 to daemon 178, rather than to X-server 150. Daemon 178 on work station 160 receives the mouse and keyboard data streams and sends them to X-server 152.

When daemon 178 receives the data streams over LAN 162, it preferably blocks out all local keyboard and mouse events from keyboard 166 and mouse 170. However, if desired, both the local mouse and keyboard set and the remote mouse and keyboard set can be allowed to control the cursor simultaneously.

As far as the X-servers are concerned, they do not know where the X-Window events are originating. Accordingly, it does not matter whether the events are coming to X-server 152 through daemon 178 over the LAN 162 or through daemon 178 locally from keyboard 166 and mouse 170.

In this embodiment of the invention, the transitioning between screens is done completely outside of the X-Window environment. Thus, whereas, in the embodiment of FIG. 8, a client other than the peripheral manager could issue GRAB keyboard and GRAB mouse commands thus defeating proper operation, this is not possible in the embodiment of FIG. 11. The issue of interference from other clients disappears because the X-Window commands data stream is being redirected outside of X-Window.

Also, in the FIG. 11 embodiment of the invention, the peripheral managers have a simpler task. Particularly, they (1) observe the appropriate ENTER WINDOW events, (2) undraw the cursor from the master screen when entering a transition window to another screen, (3) reposition the cursor when transitioning, and (4) instruct the daemon where to send the X-Window events it receives from the associated keyboard and mouse.

The embodiment of FIG. 11 also is a higher performance (faster) embodiment because there is no simulation of X-Window events. Instead, the actual keyboard and mouse data streams are simply re-routed according to mouse cursor position.

Having thus described a few particular embodiments of the invention, various alterations, modifications and improvements will readily occur to those skilled in the art. For instance, it should be understood that, while the description above of some preferred embodiments of the invention utilize a mouse as the cursor control device, any number of other input devices, such as a trackball, pen mouse, light pen, or touch screen, would work equally as effectively with the present invention. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of sharing a cursor control device amongst first and second graphic display devices, said cursor control device generating data for controlling a first cursor on said graphic display devices, said method comprising the steps of:

(1) defining a first transition window in said first graphic display device and a second, mating transition window in said second graphic display device, (2) determining when said first cursor has been moved into a first position in said first transition window, (3) when said first cursor enters said first transition window, drawing a second cursor on said second graphic display device at a predetermined second position corresponding to said first position on said first graphic display device, (4) when said first cursor enters said transition window, automatically repositioning said first cursor to a third position on said first graphic display device corresponding to said predetermined second position on said second graphic display device, (5) when said first cursor has entered said transition window, masking said first cursor on said first screen so that it does not appear, and (6) after said first cursor has entered said transition window, sending simulations of said data generated by said cursor control device to said second graphic display device.

2. A method as set forth in claim 1 wherein step (6) comprises:

(6.1) observing said data generated by said cursor control device, and (6.2) sending simulations of said data generated by said cursor control device to said second graphic display device.

3. A method as set forth in claim 2 wherein said apparatus further comprises a keyboard input device for inputting data and wherein step (6) further comprises;

(6.3) observing said data inputted from said keyboard input device, and (6.4) sending simulations of said data inputted from said keyboard input device to said second graphic display device.

4. A method as set forth in claim 1 further comprising the steps of:

(7) determining when said second cursor has been moved into a fourth position within said second transition window, (8) when said second cursor has been moved into said fourth position, deleting said second cursor from said second graphic display device, (9) when said second cursor has been moved into said fourth position, unmasking said first cursor, and

(10) when said second cursor has been moved into said fourth position, repositioning said cursor to a fifth position on said first graphic display device corresponding to said fourth position on said second graphic display device.

5. A method as set forth in claim 3 wherein said cursor control device comprises a mouse.

6. A method of sharing an input device amongst a plurality of display devices in an apparatus comprising at least first and second display devices, a cursor control input device for issuing data for moving a first cursor on said first display device and a second cursor on a second display device, and at least a first X-server for receiving said data from said cursor control device and controlling said first display device, said method comprising the steps of;

(1) defining first and second mating transition windows on said first and second display devices, respectively, (2) determining when said first cursor enters said first transition window, when said cursor enters said first transition window, (3a) grabbing from said X-server said data issued by said cursor control device, (3b) positioning said second cursor in a position on said second display device, said position being a function of a position of said first cursor when it entered said first transition window, (3c) masking said first cursor so that it does not appear on said first display device, (3d) unmasking said second cursor so that it appears on said second display device, and (3e) repositioning said first cursor on said first display device to a position spatially corresponding to said position of said second cursor on said second display device, and (4) after said first cursor has entered said first transition window and until said second cursor enters said second transition window, simulating said data from said cursor control device to said second display device.

7. A method as set forth in claim 6 wherein said apparatus further comprises a keyboard input device for issuing data to said X-server and wherein said method further comprises the steps of;

(3f) when said cursor enters said first transition window, grabbing from said X-server data issued by said keyboard input device, and (5) after said first cursor has entered said first transition window and until said second cursor enters said second transition window, simulating said data from said keyboard input device to said second display device.

8. A method as set forth in claim 6 further comprising the steps of;

when said second cursor enters said second transition window, (6a) ungrabbing said data from said cursor control device, (6b) masking said second cursor so that it does not appear on said second display device, (6c) unmasking said first cursor so that it appears on said first display device, and (6d) repositioning said first cursor on said first display device to a position on said first display device, said position being a function of a position of said second cursor when it entered said second transition window.

9. A method as set forth in claim 7 wherein said apparatus further comprises a second X-server for controlling said second display device and wherein step (4) comprises the step of;

(4.1) simulating said data from said cursor control device to said second X-server.

10. A method as set forth in claim 7 wherein said X-server controls said first and second display devices and identifies the display device to which said data is directed by use of a screen ID and wherein step (4) comprises the step of;

(4.1) altering said screen ID of said data from said cursor control device to identify said second display device.

11. An apparatus for sharing an input device amongst a plurality of display screens comprising;

first and second display screens, a cursor control device for issuing data for controlling movement of a first cursor, means for defining a first transition window in said first display screen and a second transition window in said second display screen, means for determining when said first cursor has been moved by said cursor control device into said first transition window, means for drawing a second cursor at a predetermined position on said second display screen when said first cursor enters said first transition window, said predetermined position being a function of a position of said first cursor when said first cursor enters said first transition window, means for repositioning said first cursor to a position on said first graphic display device spatially corresponding to said predetermined position on said second graphic display device, when said first cursor enters said transition window, means for masking said first cursor on said first screen so that it does not appear, when said first cursor enters said first transition window, and means for sending data from said cursor control device to said second display screen, after said first cursor has entered said first transition window and before said second cursor has entered said second transition window.

12. An apparatus as set forth in claim 11 wherein said apparatus further comprises a first X-server for controlling said first and second display screens and wherein said means for sending sends said data to said X-server with a screen identification which identifies said first display screen when said first cursor is not masked and with a screen identification which identifies said second display screen when said first cursor is masked.

13. An apparatus as set forth in claim 11 wherein said apparatus further comprises first and second X-servers for controlling said first and second display screens, respectively, and further wherein said means for sending comprises:

means for sending said data issued by said cursor control device to said second X-server when said first cursor is masked and not sending said data to said second X-server when said first cursor is not masked.

14. An apparatus as set forth in claim 11 wherein said means for sending and said first and second display screens are supported on a first work station.

15. An apparatus as set forth in claim 11 wherein at least one of said first and second display screens is supported on a first work station and said means for sending is supported on a second work station, said first and second work stations being connected over a local area network.

16. An apparatus as set forth in claim 11 further comprises a keyboard input device for issuing data and wherein said means for sending further comprises means for sending data issued by said keyboard input device.

17. An apparatus as set forth in claim 11 further comprising:

means for determining when said cursor has been moved to a position in said second transition window, means for masking said second cursor on said second graphic display device when said second cursor enters said second transition window, means for unmasking said first cursor when said second cursor enters said second transition window, and means for repositioning said first cursor to a predetermined position on said first display screen, said predetermined position being a function of a position of said second cursor when it entered said second transition window, when said second cursor enters said second transition window.

18. A method as set forth in claim 11 wherein said cursor control device comprises a mouse.

19. An apparatus for sharing an input device amongst a plurality of display devices comprising;

first and second display devices, a cursor control input device for issuing data for moving a first cursor on said first display device and a second cursor on a second display device, a first X-server for receiving said data from said cursor control device and controlling at least said first display device, means for defining first and second mating transition windows on said first and second display devices, respectively, means for determining when said first cursor enters said first transition window, means for grabbing from said first X-server said data issued by said cursor control device, after said first cursor enters said first transition window and until said second cursor enters said second transition window, means for positioning said second cursor in a predetermined position on said second display device when said cursor enters said first transition window, said predetermined position being a function of a position of said first cursor when it entered said first transition window, means for masking said first cursor so that it does not appear on said first display device, when said cursor enters said first transition window, means for unmasking said second cursor so that it appears on said second display device when said cursor enters said first transition window, means for repositioning said first cursor on said first display device to a position spatially corresponding to said position of said second cursor on said second display device when said cursor enters said first transition window, and means for simulating said data from said cursor control device to said second display device after said first cursor has entered said first transition window and until said second cursor enters said second transition window.

20. An apparatus as set forth in claim 19 further comprising;

a keyboard input device for issuing data events to said X-server, means for grabbing from said X-server said data issued by said keyboard input device when said first cursor enters said first transition window, and means for simulating said data from said keyboard input device to said second display device after said first cursor has entered said first transition window and until said second cursor enters said second transition window.

21. An apparatus as set forth in claim 19 further comprising;

means for ungrabbing said data from said cursor control device when said second cursor enters said second transition window, means for masking said second cursor so that it does not appear on said second display device, when said second cursor enters said second transition window, means for unmasking said first cursor so that it appears on said first display device, when said second cursor enters said second transition window, and means for repositioning said first cursor on said first display device to a position on said first display device when said second cursor enters said second transition window, said position being a function of a position of said second cursor when it entered said first transition window.

22. An apparatus as set forth in claim 20 further comprising a second X-server for controlling said second display device and means for simulating said data from said cursor control device and said data from said keyboard input device to said second X-server when said first cursor is masked.

23. An apparatus as set forth in claim 20 wherein said first X-server controls said first and second display devices and further comprising means for altering a screen identification in said data from said cursor control device and said keyboard input device to identify said second display device when said first cursor is masked.

* * * * *

UNITED STATES PATENT AND TRADEMARK OFFICE
CERTIFICATE OF CORRECTION

PATENT NO. : 5,748,189
DATED : May 5, 1998
INVENTOR(S) : John Trueblood

It is certified that error appears in the above-identified patent and that said Letters Patent is hereby corrected as shown below:

On cover page, Assignees' information should be inserted to read as follows: --[73]

Assignees: SONY CORPORATION, Tokyo, JAPAN and SONY ELECTRONICS INC., Park Ridge, NEW JERSEY --

Signed and Sealed this

Third Day of November, 1998

*Attest:*

*Attesting Officer*

BRUCE LEHMAN

Commissioner of Patents and Trademarks